United States Patent
Herron et al.

(10) Patent No.: US 10,414,277 B1
(45) Date of Patent: Sep. 17, 2019

(54) BATTERY CHARGER WITH PROJECTING MEMBERS

(71) Applicant: Drew Technologies, Inc., Ann Arbor, MI (US)

(72) Inventors: Brian J. Herron, Dexter, MI (US); Michael L. Drew, Dexter, MI (US)

(73) Assignee: Drew Technologies, Inc., Ann Arbor, MI (US)

( * ) Notice: Subject to any disclaimer, the term of this patent is extended or adjusted under 35 U.S.C. 154(b) by 26 days.

(21) Appl. No.: 15/485,643

(22) Filed: Apr. 12, 2017

(51) Int. Cl.
  *H02J 7/14* (2006.01)
  *H02J 7/00* (2006.01)
  *B60L 11/18* (2006.01)

(52) U.S. Cl.
  CPC ....... *B60L 11/1818* (2013.01); *B60L 11/1838* (2013.01); *H02J 7/0045* (2013.01); *H02J 7/0047* (2013.01); *H02J 7/0052* (2013.01); *H02J 2007/0049* (2013.01)

(58) Field of Classification Search
  USPC ........................................................ 320/105
  See application file for complete search history.

(56) References Cited

U.S. PATENT DOCUMENTS

| | | | | |
|---|---|---|---|---|
| 3,778,650 A | * | 12/1973 | Tharman | H01L 25/03 174/16.3 |
| 4,272,142 A | * | 6/1981 | Zapf | H01R 13/717 439/504 |
| 5,230,637 A | * | 7/1993 | Weber | H01R 11/24 320/105 |
| 5,367,243 A | * | 11/1994 | Wells | H01M 2/305 320/105 |
| 5,635,817 A | * | 6/1997 | Shiska | H02G 11/02 320/105 |
| 5,921,809 A | * | 7/1999 | Fink | H01M 2/305 439/504 |
| 6,527,585 B1 | * | 3/2003 | Pannone | H01R 11/24 439/504 |
| 6,636,015 B1 | * | 10/2003 | Levine | H01M 2/1072 320/104 |
| 6,650,086 B1 | * | 11/2003 | Chang | H01M 2/342 320/105 |
| 6,759,833 B1 | * | 7/2004 | Chen | H01M 2/342 320/105 |
| 7,786,851 B2 | | 8/2010 | Drew et al. | |
| 7,928,837 B2 | | 4/2011 | Drew et al. | |

(Continued)

OTHER PUBLICATIONS

Commonly assigned co-pending U.S. Appl. No. 15/446,744, filed Mar. 1, 2017, entitled Remote Diagnostic System and Method.

(Continued)

*Primary Examiner* — Samuel Berhanu
(74) *Attorney, Agent, or Firm* — Gardner, Linn, Burkhart & Ondersma LLP (57) ABSTRACT

A vehicle battery charger includes a charger housing that contains electrical circuitry that is configured to couple with a power source for charging a vehicle battery. The battery charger also includes two projecting members that are coupled with the electrical circuitry and that extend through spaced apart apertures in the charger housing. An exterior portion of each of the two projecting members comprises an exposed conductive surface that is configured to be engaged by a clamp of a jumper cable that extends to the vehicle battery.

20 Claims, 5 Drawing Sheets

(56) References Cited

U.S. PATENT DOCUMENTS

| | | | |
|---|---|---|---|
| 8,339,254 B2 | 12/2012 | Drew et al. | |
| D675,568 S | 2/2013 | Drew et al. | |
| 8,638,207 B2 | 1/2014 | Drew et al. | |
| D701,832 S | 4/2014 | Drew et al. | |
| D718,201 S | 11/2014 | Drew et al. | |
| 8,901,877 B2 * | 12/2014 | Brockman | F02N 11/12 320/105 |
| D725,519 S | 3/2015 | Drew et al. | |
| 9,770,992 B2 * | 9/2017 | Nook | H02J 7/0054 |
| 2005/0040788 A1 * | 2/2005 | Tseng | H02J 7/0027 320/111 |
| 2006/0145655 A1 * | 7/2006 | Sheng | H02J 7/0034 320/105 |
| 2010/0244766 A1 * | 9/2010 | Olsberg | H02J 7/0047 320/105 |
| 2011/0153150 A1 | 6/2011 | Drew et al. | |
| 2014/0086242 A1 | 3/2014 | Drew et al. | |
| 2014/0121894 A1 | 5/2014 | Drew et al. | |
| 2014/0121937 A1 | 5/2014 | Drew et al. | |
| 2014/0172230 A1 | 6/2014 | Drew et al. | |
| 2014/0297099 A1 | 10/2014 | Drew et al. | |
| 2014/0309905 A1 | 10/2014 | Drew et al. | |
| 2017/0172397 A1 | 6/2017 | Zardini | |

OTHER PUBLICATIONS

Commonly assigned co-pending U.S. Appl. No. 15/651,351, filed Jul. 17, 2017, entitled RVehicle Diagnostic and Programming Device and Method.

Commonly assigned co-pending U.S. Appl. No. 15/485,531, filed Apr. 12, 2017, entitled Vehicle Programming and Diagnostic Device With Integrated Battery Charger.

Commonly assigned co-pending U.S. Appl. No. 26/600,447, filed Apr. 12, 2017, entitled Vehicle Diagnostic Device.

* cited by examiner

BATTERY CHARGER WITH PROJECTING MEMBERS

BACKGROUND OF THE INVENTION

The present invention is directed to a battery charger, and in particular to a battery charger for charging a vehicle battery and/or jump-starting a vehicle.

Vehicle battery chargers are well known for jump-starting or charging vehicle batteries that are commonly used to start an associated engine of the vehicle, such as for cars, motorcycles, boats, and the like. Typically, vehicle battery chargers include integrated cables for connecting to a battery. These cables can wear or degrade at a faster rate than the life of the associated battery charger or can otherwise be damaged, especially when frequently used, such as in automotive repair garages, or when exposed to inclement weather conditions, such as on tow trucks or boats.

SUMMARY OF THE INVENTION

The present invention provides a battery charger with two projecting members or charging posts that are arranged to enable the attachment of standard jumper cables via connectors, such as alligator clips or clamps, at ends of the jumper cables. These projecting members provide electrical current through the jumper cables to a vehicle battery connected to the opposite end of the jumper cables for charging the vehicle battery.

According to an aspect of the present invention, a battery charger includes a charger housing that contains electrical circuitry that is configured to couple with a power source for charging a vehicle battery. The battery charger also includes two projecting members that are coupled with the electrical circuitry and that extend through spaced apart apertures in the charger housing. An exterior portion of each of the two projecting members comprises an exposed conductive surface that is configured to be engaged by a clamp of a jumper cable that extends to the vehicle battery.

According to another aspect of the present invention, a vehicle battery charging system includes a set of jumper cables that has a first pair of clips at a first end of the set of jumper cables and a second pair of clips at a second end of the jumper cables. The system also includes a battery charger that has a charger housing containing electrical circuitry operable to deliver a desired current or voltage to a vehicle battery. Two metal posts of the battery charger that are coupled with the electrical circuitry project from the charger housing. The two metal posts of the battery charger are configured for the first pair of clips to engage exposed conductive surfaces of the two metal posts, where the second pair of clips are configured to engage and charge a vehicle battery.

According to yet another aspect of the present invention, a method for charging a vehicle battery includes providing a battery charger that has a pair of projecting members extending through a pair of spaced apart apertures in a charger housing. The pair of projecting members each comprises an exposed conductive surface. A first pair of clips at a first end of jumper cables are attached to the exposed conductive surfaces of the pair of projecting members. A second end of the jumper cables are attached to a vehicle battery, and the battery charger is activated to charge the vehicle battery.

By the battery charger of the present invention having projecting members or charging posts, instead of integrated cables, the jumper cables that attach to the projecting members can be easily replaced or exchanged when they become worn or damaged. Also, by being able to remove the jumper cables from the projecting member, there is reduced risk that arcing will occur between the stationary and spaced apart projecting members, as may otherwise be more probable when cables are integrated with a battery charger and loose ends can easily move into unintentional contact.

These and other objects, advantages, purposes and features of this invention will become apparent upon review of the following specification in conjunction with the drawings.

DESCRIPTION OF THE PREFERRED EMBODIMENTS

Figure 1:
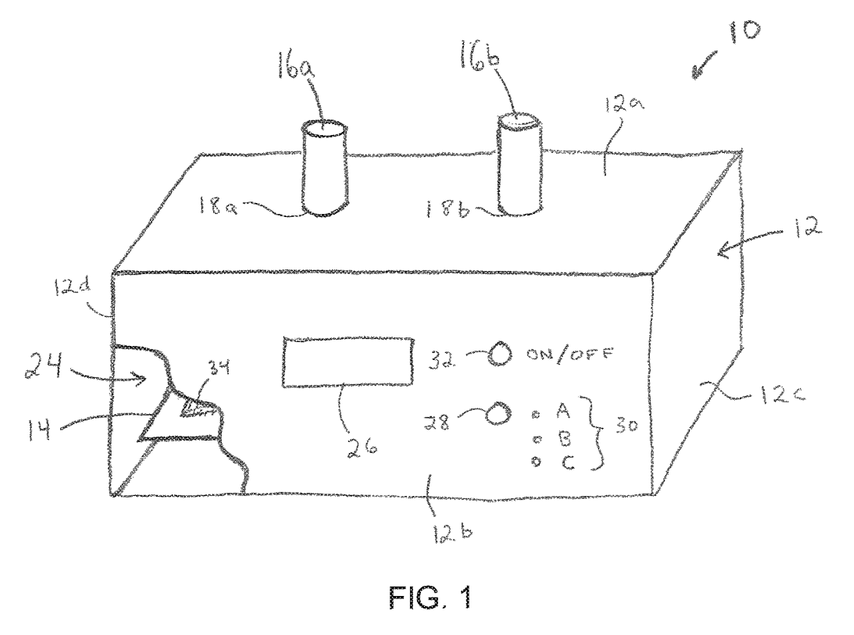
FIG. 1 is a perspective view of a vehicle battery charger in accordance with an embodiment of the present invention with a portion of a charger housing cutaway to expose electrical circuitry contained in the battery charger.
Figure 2:
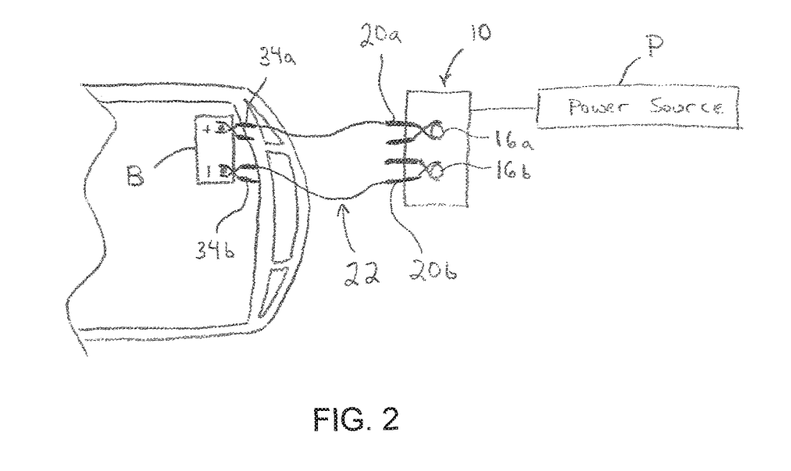
FIG. 2 is a top view of the vehicle battery charger of FIG. 1 connected to a vehicle battery via jumper cables.
Figure 3:
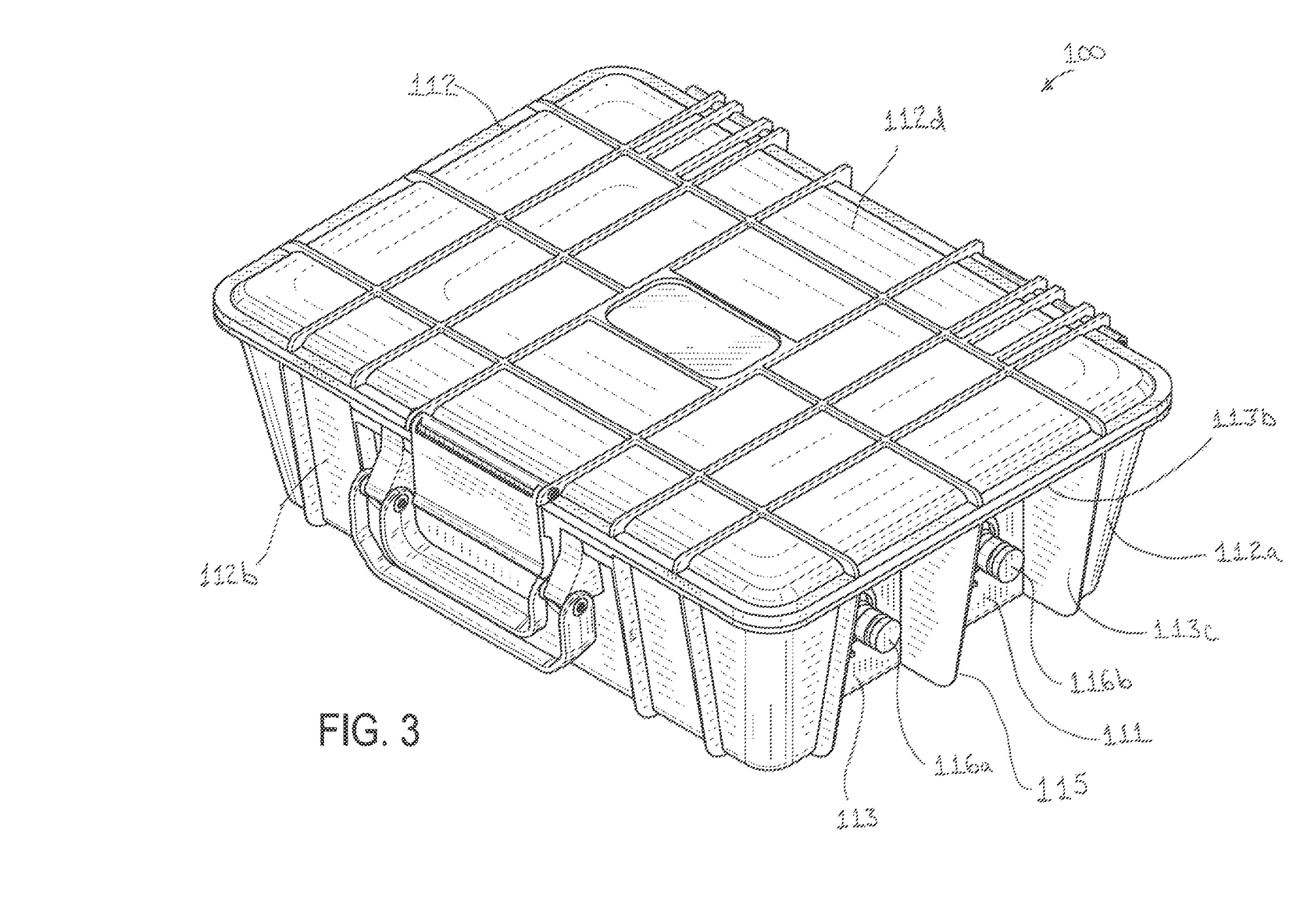
FIG. 3 is a perspective view of an alternative vehicle battery charger in accordance with another embodiment of the present invention.
Figure 4:
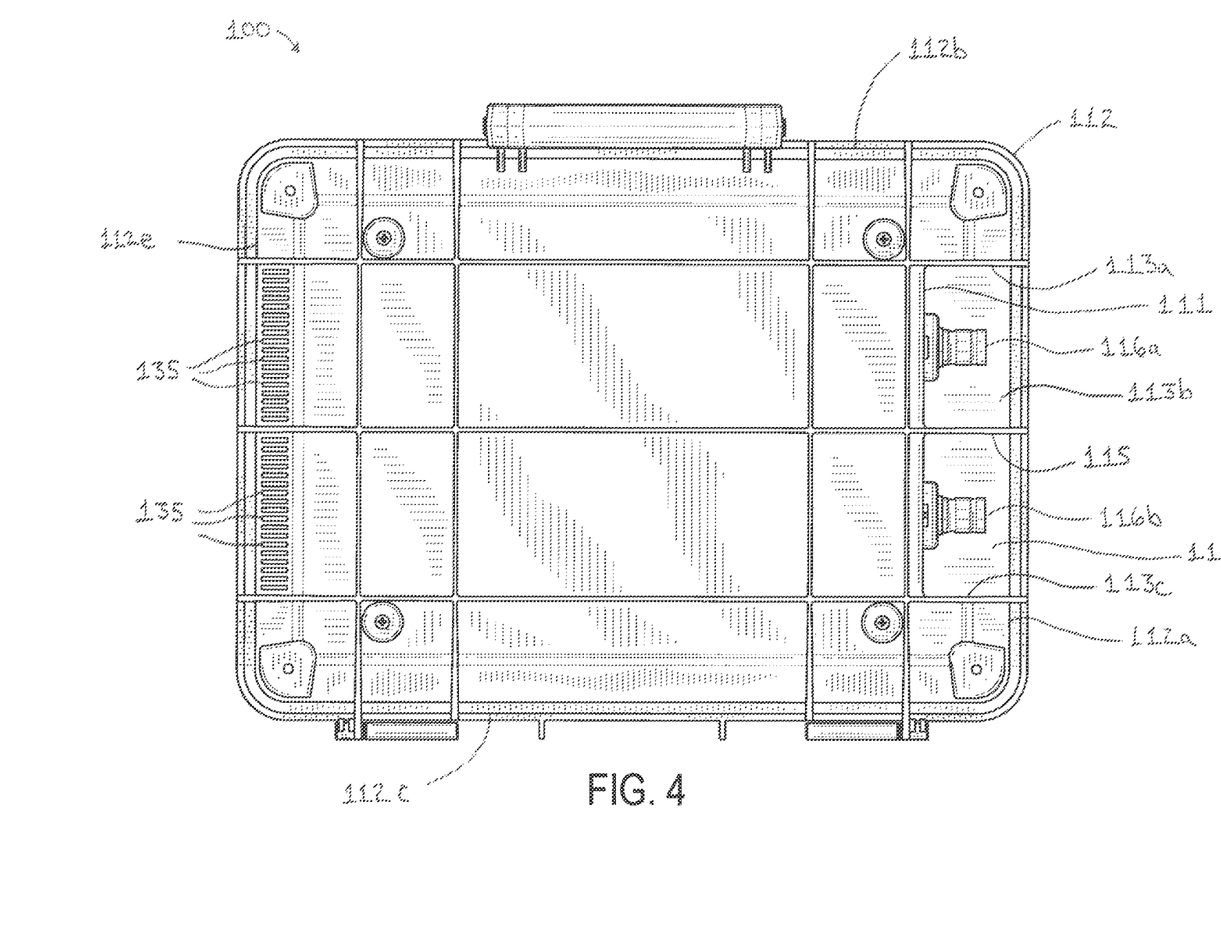
FIG. 4 is a bottom plan view of the vehicle battery charger of FIG. 3.

The present invention will now be described with reference to the accompanying figures, wherein the numbered elements in the following written description correspond to like-numbered elements in the figures. Referring to FIGS. 1 and 2, a vehicle battery charger 10 is provided that has a charger housing 12, which generally contains electrical circuitry 14 that is configured to electrically couple with a power source P, such as provided by plugging a power cord of charger 10 into an external conventional wall outlet receptacle to provide 120V AC power and/or an onboard battery, for charging a vehicle battery B (FIG. 2). The battery charger 10 includes two projecting members 16a, 16b that are electrically coupled with the electrical circuitry 14 and extend through spaced apart apertures 18a, 18b in the charger housing 12. An exposed or exterior portion of each of the two projecting members 16a, 16b have an outer or exposed conductive surface that is configured to be engaged by a clamp 20 of a jumper cable 22 that extends to the vehicle battery B for charging (FIG. 2).

The charger housing 12, as shown in FIG. 1, provides a rectangular box shape with a substantially hollow or open interior volume 24 for housing the electrical circuitry 14. The charger housing 12 may comprise one or a combination of materials, such as steel, aluminum, plastic, or other conceivable metals or polymers that form a protective enclosure around the electrical circuitry 14 of the battery charger 10. Accordingly, the charger housing 12 may also comprise various alternative shapes and configurations in additional embodiments of the vehicle battery charger, with the housing defining an outer periphery of the battery charger 10.

The illustrated charger housing 12 includes the two apertures 18a, 18b arranged at an upper portion of the charger housing 12, such that the apertures extend through an upper, substantially horizontal top surface 12a of the charger housing 12. The apertures 18a, 18b are spaced apart from each other a distance sufficient to generally prevent arcing between the associated projecting members and to generally deter any contact or close proximity between the clamps 20a, 20b of the jumper cables 22 when engaging the projecting members 16a, 16b (FIG. 2). The apertures 18a, 18b are also shaped to mate around in tight engagement with the associated projecting members 16a, 16b. Accordingly, it is contemplated that in additional embodiments of the vehicle battery charger, the apertures may be arranged on different surfaces or areas of the charger housing, such as on opposing sides 12c, 12d of the charger housing, and further it is conceivable that the apertures may have various different shapes to accommodate the associated shapes of the two projecting members.

The projecting members 16a, 16b, as illustrated, each comprise a metallic post having a generally cylindrical shape that is positioned such that the axis of the members are generally vertically oriented. The projecting members 16a, 16b are disposed to extending through the apertures 18a, 18b, such that the projecting members are generally fixed in place relative to the charger housing 12. The projecting members 16a, 16b are thereby positioned and sized for the clamps 20 of the jumper cables 22 to easily engage exposed conductive surfaces of the projecting members 16a, 16b. As such, it is contemplated that the projecting members 16a, 16b in additional embodiments may be differently shaped or positioned on the charger housing to securely engage with jumper cable clamps or clips, and further, the exterior portion of the projecting members may be partially concealed, such as with a plastic sheathing, so as to limit the exposed conducted surface to only an area needed for engaging the jumper cables.

An internal portion (not shown) of the projecting members 16a, 16b extends into the charger housing 12 to be secured in place relative to the housing 12 and electrically coupled with the electrical circuitry 14 and thereby also electrically coupled with the power source P (FIG. 2). The electrical circuitry 14 operates for the two projecting member 16a, 16b to have charges of opposite polarity. As shown in FIG. 1, the electrical circuitry 14 is also connected to a display 26 that is disposed at the front surface 12b of the charger housing 12. The display 26 may be an electromechanical meter, a digital liquid crystal display (LCD), light emitting diode (LED) display, or other like displays or readouts. Thus, the display 26 may provide a current meter (ammeter) that is operable to display an output current from the two projecting members 16a, 16b to the vehicle battery B.

Also, the electrical circuitry 14 may comprise a selector switch 28, such as shown disposed at the front surface of the charger housing 12. The selector switch 28 may be operable to select a desired output amperage or charge rate for the attached vehicle battery, such that the battery charger can accommodate different types of vehicle batteries or charging conditions. The illustrated selector switch 28 also provides indicator lights 30 that are associated with the selected settings, where the settings A, B, and C may be associated with output amperage, such as 2 amp, 10 amp, and 50 amp respectively for trickle charging, fast charging, and jump starting. Further, an on/off switch 32 may also be disposed at the front surface of the charger housing 14 for manually turning the charger on and off. It is appreciated that additional embodiments of the battery charger may have varied shape, size, location, and layout of the display, selector switch, indicator lights and other conceivable readouts or user inputs that may be provided for operating the battery charger. Still further, the battery charger may be configured to charge by supplying a constant voltage or current, and may be constructed as what are referred to as a simple charger, a fast charger, an intelligent charger, or a pulse charger. Housing 12 may also include vents or apertures, with battery charger 10 including an internal fan for cooling of the internal circuitry 14.

The illustrated electrical circuitry 14 includes a controller or microcontroller 34 that is operable to periodically alternate charging and charging rates, and also to automatically stop charging the vehicle battery when it is fully charged. The associated status of charging and the battery's charge status may further be indicated with additional lights and/or via a display. The electrical circuitry 14 may also have transformers, diodes, rectifiers, heat sinks, fans, and other electrical components that may generally be used to operate a vehicle battery charger.

With respect to FIG. 2, the set of jumper cables 22 are shown with a pair of clamps 20a, 20b at one end of each of the cables in the set of jumper cables 22 and another pair of clamps 34a, 34b at the other end of the cables in the set of jumper cables 22. The cables in the set of the jumper cables 22 may be separated (as shown in FIG. 2) or fused together, such as with an integral covering applied to the cables along an intermediate section of the cables between the opposing ends. The clamps may be alligator clips or other conceivable clamps used on standard jumper cables. The first pair of clips or clamps 20a, 20b of the jumper cables 22 are attached respectively to the exposed conductive surfaces of the projecting members 16a, 16b. Similarly, the second pair of clips or clamps 34a, 34b of the jumper cables 22 may be attached respective to corresponding polarity connections or posts of the vehicle battery B. It is also understood that, in some instances, it may be preferable to detach from the battery any leads from the vehicle, so as to prevent damage to the vehicle electronics, such as the alternator.

As further shown in FIG. 2, the battery charger 10 is engaged by the jumper cables 22 that are also engaged at the opposite end with the vehicle battery B, defining a connected condition. When in this connected condition, the battery charger 10 can be turned on for the battery charger to begin charging the vehicle battery B, via the power source P. The power source may be a remote electrical outlet or receptacle that is engaged by a power cord that extends from the charger housing. Also, the power source may additionally or alternatively include a portable battery that is contained in the charger housing, so that the battery charger can more easily be used in a remote location.

Referring now to FIGS. 3-6, an alternative vehicle battery charger 110 is illustrated that shares features of vehicle battery charger 10, with similar features of charger 110 relative to charger 10 being labeled with similar reference numerals, but with "100" added thereto.

Vehicle battery charger 110 includes a housing 112, with housing 112 being generally rectangular in shape in the illustrated embodiment. Charger 110 includes a pair of charging posts 116a, 116b located on a side 112a of housing 112. As understood from FIGS. 3 and 4, housing 112 includes a recess 113 defining a cavity at side 112a within which posts 116a, 116b are located, where recess 113 is defined by sidewalls 113a, 113b, 113c. Recess 113 is thus setback or recessed from the outer periphery of housing 112 established by the front side 112b, back side 112c and top 112d. In particular, the location at which posts 116a, 116b exit from wall portion 111 of housing 112 in the illustrated embodiment is setback or recessed from the outer periphery or perimeter of surrounding walls 112b, 112c and 112d. As such, recess 113 helps protect posts 116a, 116b from being inadvertently damaged. In the illustrated embodiment, as understood from FIG. 4, the distal ends of posts 116a, 116b relative to wall portion 111 do not extend beyond the periphery or perimeter of surrounding walls 112b, 112c and 112d. Still further, an elongate rib 115 is disposed between posts 116a, 116b to aid in separating or preventing contact of the ends 20a, 20b of jumper cables 22 when connected to charger 110. In the illustrated embodiment, recess 113 is not bounded by a wall associated with the bottom of housing 112. It should be appreciated, however, that alternatively configured recesses or cavities may be employed within the scope of the present invention. For example, a recess may be bounded by four walls, or may be bounded by a curved wall, and/or may be disposed at different locations, and/or may include more than one such recess.

Figure 5:
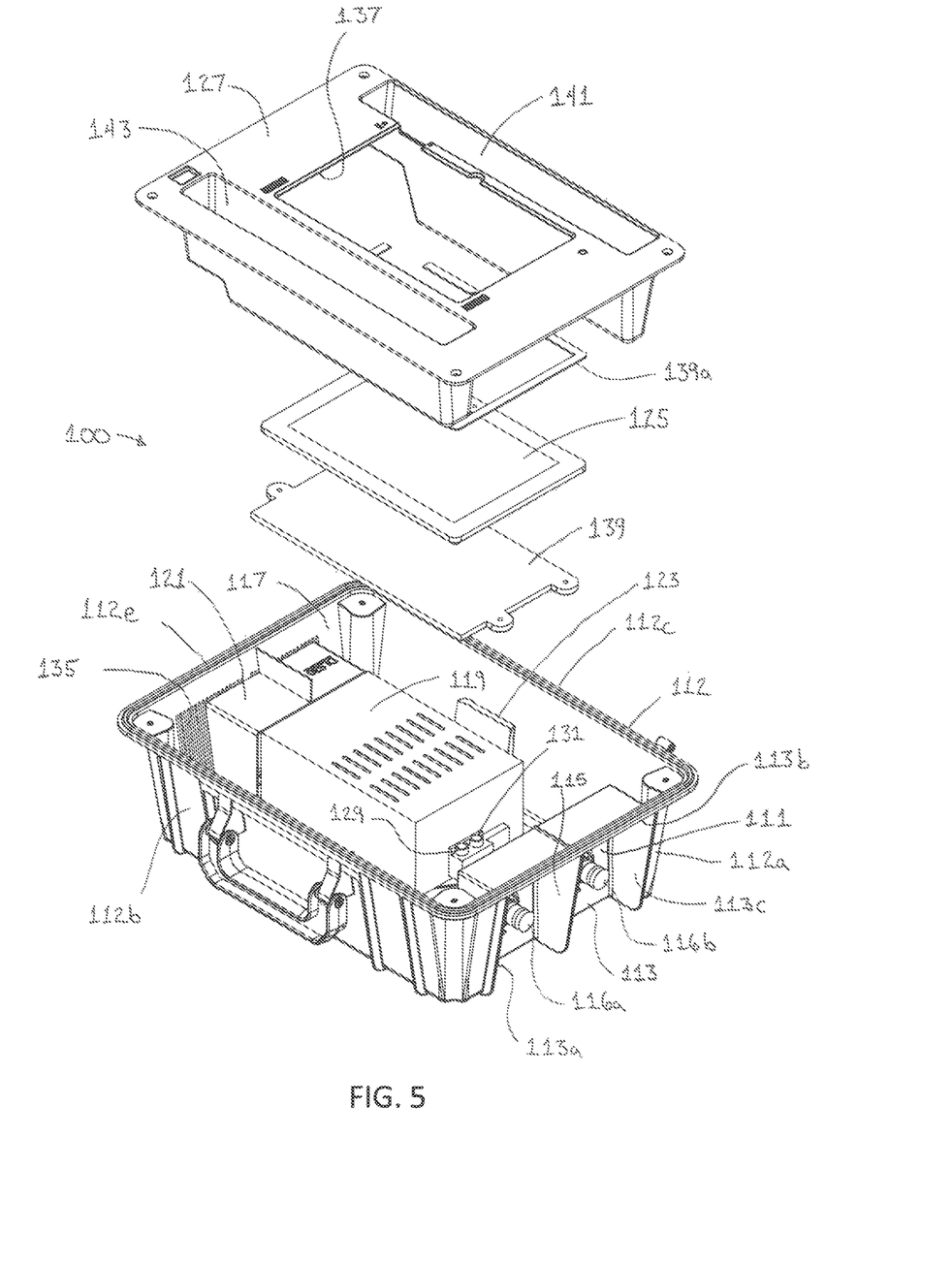
FIGS. 5-6 are partial internal perspective views of the vehicle battery charger of FIG. 3.
Figure 6:
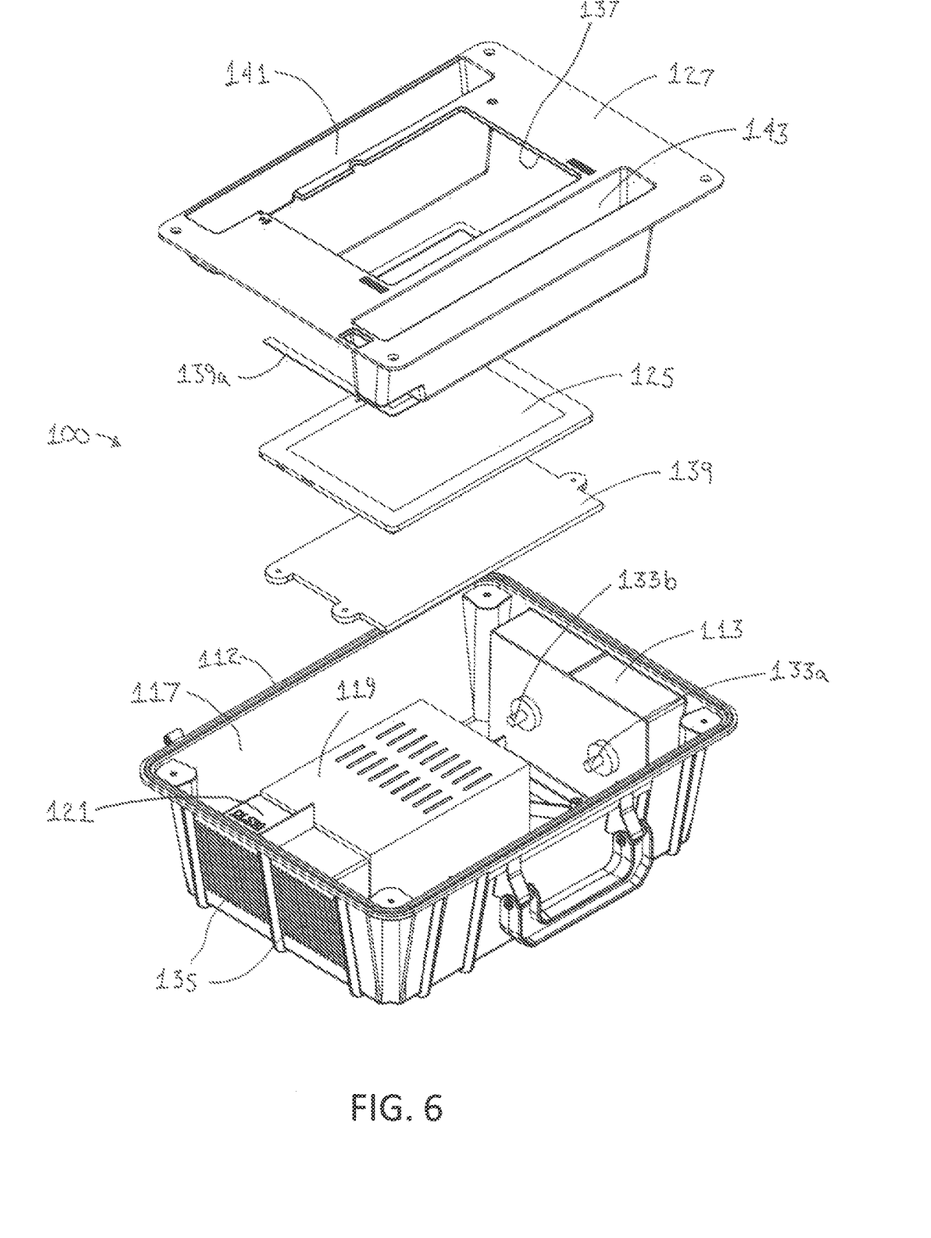

Referring now to FIGS. 5 and 6, charger 110 is shown to include an internal compartment 117 within which a battery charger device 119, fan 121, control or circuit board 123 (FIG. 5) comprising circuitry for operating charger 110, display and insert 127 are retained. Device 119 includes a pair of posts 129, 131 to which cables or wires (not shown) may be affixed and extend to the internally extending ends 133a, 133b of posts 116a, 116b to supply a current or voltage to posts 116a, 116b. Housing 112 additionally includes vents 135 on side 112e through which fan 121 may discharge heat generated within compartment 117.

In the illustrated embodiment, display 125 is secured within aperture 137 of insert 127 by being held there against by backing member 139 and with a frame 139a, where display 125 may be connected with circuit board 123 such that display 125 may be used to control the operation of charger 110, such as setting the charger to provide a trickle charge, fast charge, or jumping charge, and/or display operating and/or battery status information. Insert 127 additionally includes a pair of compartments 141, 143, within which power cords to supply power to device 119 or jumper cables 22 may be retained. Compartments 141, 143 extend downwardly to define legs that straddle device 119.

Top 112d in the illustrated embodiment comprises a lid that is able to be opened to access compartments 141, 143 and display 125, which charger 110 additionally including a handle 145 for ease of transport of charger 110. Although housing 112 in the illustrated embodiment of FIGS. 3-6 is disclosed as a housing having an openable lid 112d and handle 145, it should be appreciated that alternatively configured housings for battery chargers in accordance with the present invention may be formed to have a recess or cavity, such as recess 113 of housing 112, within the scope of the present invention. For example, housing 12 of charger 10 discussed above may be alternatively configured to include such a recess for providing protection to posts 16a, 16b. Moreover, such a recess may be disposed at various locations about a housing. Still further, charger 110 may additionally be configured for use in diagnosing and reprogramming a vehicle, such as via connection with an on-board diagnostic port of a vehicle. In such a configuration, controller 123 may be further adapted for communicating with vehicle computers, and/or display 125 may comprise a computing device.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A battery charger comprising:
   a charger housing that contains electrical circuitry that is configured to couple with a power source for charging a vehicle battery; and
   two projecting members coupled with the electrical circuitry and extending through spaced apart apertures in the charger housing such that the two projecting members protrude outwardly from the spaced apart apertures beyond an outer periphery of the charger housing, wherein an exterior portion of each of the two projecting members comprises an exposed conductive surface that is configured to be engaged by a clamp of a jumper cable that extends to the vehicle battery.

2. The battery charger of claim 1, wherein substantial portions of the two projecting members protrude outwardly from the spaced apart apertures, wherein the spaced apart apertures are shaped to mate in a tight engagement with the two projecting members, and wherein each of the two projecting members comprise a metallic post that is fixed relative to the charger housing.

3. The battery charger of claim 1, wherein the electrical circuitry is operable for the two projecting members to comprise charges of opposite polarity.

4. The battery charger of claim 1, further comprising a selector switch communicatively coupled to the electrical circuitry and operable to select a desired output amperage for charging the vehicle battery, wherein the electrical circuitry includes a controller operable to alternate charging rates of the vehicle battery.

5. The battery charger of claim 4, wherein the electrical circuitry comprises the controller that is operable to stop charging the vehicle battery when the vehicle battery is fully charged.

6. The battery charger of claim 1, further comprising a display communicatively coupled to the electrical circuitry and operable to display an output current from the two projecting members for the vehicle battery.

7. The battery charger of claim 1, wherein said charger housing defines outer sides, and wherein said outer sides define the outer periphery of said charger housing, and wherein at least one said outer side includes a recess defining a cavity, and wherein at least one of said projecting members is disposed within said recess whereby said at least one projecting member is at least partially setback from the outer periphery of said charger housing.

8. The battery charger of claim 7, wherein both said projecting members are disposed within said recess.

9. A vehicle battery charging system comprising:
   a set of jumper cables having a first pair of clamps at a first end of the set of jumper cables and a second pair of clamps at a second end of the set of jumper cables; and
   a battery charger comprising (i) a charger housing that contains electrical circuitry operable to deliver a desired current to a vehicle battery and (ii) two metal posts coupled with the electrical circuitry and projecting from the charger housing such that the two projecting members protrude outwardly beyond an outer periphery of the charger housing; and
   wherein the two metal posts of the battery charger are configured for the first pair of clamps to engage exposed conductive surfaces of the two metal posts beyond an outer periphery of the charger housing, and wherein the second pair of clamps are configured to engage and charge a vehicle battery.

10. The vehicle battery charging system of claim 9, wherein substantial portions of the two projecting members protrude outwardly from the spaced apart apertures, and wherein the electrical circuitry is operable for the two metal posts to comprise charges of opposite polarity.

11. The vehicle battery charging system of claim 9, further comprising a selector switch communicatively coupled to the electrical circuitry and operable to select a desired output amperage for charging the vehicle battery, wherein the electrical circuitry includes a controller operable to alternate charging rates of the vehicle battery.

12. The vehicle battery charging system of claim 9, wherein the electrical circuitry comprises the controller that is operable to stop charging the vehicle battery when the vehicle battery is fully charged.

13. The vehicle battery charging system of claim 9, wherein the battery charger comprises a display communicatively coupled to the electrical circuitry and operable to display an output current from the two metal posts for the engaged vehicle battery.

14. The vehicle battery charging system of claim 9, wherein said charger housing defines outer sides, and wherein said outer sides define the outer periphery of said charger housing, and wherein at least one said outer side includes a recess defining a cavity, and wherein at least one of said projecting members is disposed within said recess whereby said at least one projecting member is at least partially setback from the outer periphery of said charger housing.

15. The battery charger of claim 14, wherein both said projecting members are disposed within said recess.

16. A method for charging a vehicle battery, said method comprising:
providing a battery charger having a pair of projecting members extending through a pair of spaced apart apertures in a charger housing such that the two projecting members protrude outwardly from the pair of spaced apart apertures beyond an outer periphery of the charger housing, wherein each of the pair of projecting members comprises an exposed conductive surface;
attaching a first pair of clamps at a first end of jumper cables to the exposed conductive surfaces of the pair of projecting members beyond an outer periphery of the charger housing;
attaching a second end of the jumper cables to a vehicle battery; and
activating the battery charger to charge the vehicle battery.

17. The method of claim 16, wherein substantial portions of the two projecting members protrude outwardly from the spaced apart apertures, and wherein the pair of projecting members each comprise a metallic post.

18. The method of claim 16, wherein the battery charger comprises electrical circuitry that is operable to select a desired output amperage for the vehicle battery a display operable to display an output current, a selector switch operable to select output amperage for charging the vehicle battery, and a controller operable to alternate charging rates of the vehicle battery.

19. The method of claim 16, wherein the battery charger comprises an electrical cable that is configured to connect to a power source for charging the vehicle battery.

20. The method of claim 16, wherein said charger housing defines outer sides, and wherein said outer sides define the outer periphery of said charger housing, and wherein one said outer side includes a recess defining a cavity, and wherein said projecting members are disposed within said recess whereby said projecting members are at least partially setback from the outer periphery of said charger housing.

* * * * *